United States Patent [19]
Ahn

[11] Patent Number: 5,629,849
[45] Date of Patent: May 13, 1997

[54] METHOD FOR CONTROLLING OPERATION OF REPEATED WORK OF EXCAVATOR VEHICLE

[75] Inventor: Seong-Ho Ahn, Seoul, Rep. of Korea

[73] Assignee: Samsung Heavy Industries Co., Ltd., Kyoungsangnam-do, Rep. of Korea

[21] Appl. No.: 541,717

[22] Filed: Oct. 10, 1995

Related U.S. Application Data

[63] Continuation of Ser. No. 164,711, Dec. 10, 1993, abandoned.

[30] Foreign Application Priority Data

Jun. 30, 1993 [KR] Rep. of Korea ............... 93-12199

[51] Int. Cl.⁶ ............................................. G06F 17/00
[52] U.S. Cl. ...................... 364/424.07; 364/167.01; 414/699; 340/686
[58] Field of Search ............... 364/167.01, 424.07; 414/698, 699; 340/684, 686; 37/348, 414, 415, 902, 907

[56] References Cited

U.S. PATENT DOCUMENTS

| | | | |
|---|---|---|---|
| 4,288,196 | 9/1981 | Sutton, II | 414/699 |
| 5,170,342 | 12/1992 | Nakamura et al. | 364/167.01 |
| 5,224,033 | 6/1993 | Nakamura et al. | 364/424.07 |
| 5,257,177 | 10/1993 | Bach et al. | 364/167.01 |
| 5,274,557 | 12/1993 | Moriya et al. | 364/167.01 |
| 5,356,259 | 10/1994 | Hanamoto et al. | 37/348 |
| 5,359,517 | 10/1994 | Moriya et al. | 364/167.01 |
| 5,361,211 | 11/1994 | Lee et al. | 340/686 |

*Primary Examiner*—Gary Chin
*Attorney, Agent, or Firm*—Antonelli, Terry, Stout & Kraus, LLP

[57] ABSTRACT

The present invention relates to a method for automatically controlling prescribed work to be repeatedly done by the excavator. An electronic control using a processor and sensors is used to precisely control the work under program control regardless of the hardness of the ground. The controlling method according to the present invention utilizes stored data of the position of each of the joints of the actuators when the prescribed work is performed. During the repeated work, each joint is able to maintain its desired position regardless of the hardness of the ground. Further, because the operational mode can be stored at the same time as storing of the data for the prescribed work, the invention compares the operational mode with the repeated work. The performance speed of the repeated work can be controlled as much as intended by the operator. The repeated work can be performed with high speed when an unskilled operator stores the operation of the prescribed work with a slow speed. The work efficiency of the excavator is enhanced.

5 Claims, 3 Drawing Sheets

METHOD FOR CONTROLLING OPERATION OF REPEATED WORK OF EXCAVATOR VEHICLE

This application is a continuation of application Ser. No. 08/164,711 filed on Dec. 10, 1993 now abandoned.

FIELD OF THE INVENTION

The present invention relates to a method for controlling the operation of an excavator vehicle and, more particularly, to a method for automatically controlling the prescribed work to be repeatedly done by the excavator vehicle such that the work is precisely performed regardless of the hardness of the ground.

DESCRIPTION OF THE PRIOR ART

A conventional excavator vehicle includes, as shown in attached drawing FIG. 1, a boom 1 coupled to the main body, a dipper 2 connected with the boom by a rotating pin, and a bucket 3 coupled to the dipper. Further, there is provided a boom cylinder 4 to couple the boom 1 with the main body. The boom cylinder has a piston 4' for moving the boom 1. A dipper cylinder 5 is provided to couple the dipper 2 with the boom 1. The dipper cylinder has its piston 5' for moving the dipper 2. A bucket cylinder 6 is provided between the dipper 2 and the bucket 3 in which the piston 6' thereof is connected with a connecting rod 7' supported by a yoke 7 which is provided at one end of the dipper 2.

The fluid pressure supplied to each cylinder 4, 5, and 6 is controlled by the main control valve in the hydraulic system, as is well known in the art.

Generally, the excavating operation is performed by manipulating the control lever so that the respective valves relative to the movement of the boom 1, the dipper 2, and the bucket 3 may be controlled to move each piston of the cylinders as much as the quantitative displacement of the fluid (the movement of the operating oil) provided at both sides of each cylinders 4, 5, and 6.

With the enhanced reliability of low priced electronic components and the advancement of sensor technology, a new field of art called mechatronics is now applied throughout industrial machines.

As such technology is applicable to heavy equipment, an attempt has been made to generalize the application of electronic control to an excavator vehicle, a crane, a bulldozer and so forth, in the form of the hydronics which is the combination of hydrodynamics and electronics.

Despite the most popular equipment being the excavator vehicle, however, its usage is relatively different from other equipments, which results in a shortage of skilled operators for the excavator vehicle.

Therefore, application of electronic control to the conventional hydraulic excavator vehicle, by using microprocessors, electromagnetic proportional valves, electronic sensors and so forth, makes it possible to operate the excavator vehicle in an easier and faster manner with less skilled operators.

In the meantime, when the operator runs the excavator vehicle to perform, for example, trench digging, the work consists of digging down into the ground and throwing the ground outside the trench, moving the main body of the excavator vehicle backward to a new position to be dug, by the operation of the operating means such as control lever and pedal.

Such a simple repeated operation, continuously performed by manual operation, is boring and ineffective for the operator. To solve this problem, an improvement has been made to the conventional excavator vehicle such that the above-mentioned electronic control is incorporated into the excavator vehicle.

In the system of this type, the electronic control operates generating an electrical signal corresponding to the operating quantity of the manual operating means; converts the electrical signals to digital data; stores the digital data in a storage means; and performs the work of the excavator vehicle repeatedly in accordance with the stored data.

However, the above method in practice has poor repeatability for digging into the ground because the work load varies according to the hardness of the ground.

For example, if the ground is very hard when the operator stores the digging procedure in a storage means, and afterwards the repeated work of digging the ground encounters relatively soft ground, each attachment between the boom, the dipper, and the bucket will work differently than the initial work which makes it difficult to constantly repeat the work to be performed.

SUMMARY OF THE INVENTION

The present invention is intended to overcome the above described disadvantages of the conventional digging techniques.

Therefore, it is an object of the present invention to provide a method for controlling the repeated working of excavator vehicle, in which the work can be carried out in a precise manner, regardless of the hardness of the ground.

Another object of the present invention is to provide a method for controlling the operation of excavator vehicle, in which the speed of working can be controlled as much as necessary by the operator to enhance the efficiency of the digging process.

In achieving the above objects, the present invention resides in a method for automatically controlling the prescribed work to be repeatedly performed by the excavator vehicle based upon the stored data related to the prescribed work which comprises: determining whether a repetition initiating variable (go-pb) is "true", and otherwise accumulating the sampling time for storing of the data; calculating a first object angle ta() of each attachment of the excavator vehicle and comparing the accumulated sampling time with the predetermined time (ft) which is predicted for moving the attachment to the starting point of the repeated work, and if the expected time (ft) exceeds the accumulated sampling time, the accumulation time is limited; determining a speed ratio between the performance speeds of the storing and the repeated work after initializing a positioning variable and setting the repetition initiating variable (go-pb) to "true", followed by determination whether each attachment reaches the starting point; calculating a second object angle of each attachment after controlling the speed ratio according to follow-up characteristics when the stored position of each attachment can be followed; transforming the first object angle or the second object angle into the position data of each cylinder related to each attachment when each attachment does not reach the starting point for the repeated work or the second object angle has been determined; calculating a possible discharge amount of fluid flow of pumps after obtaining an object speed of each cylinder in consideration of the object speed and the discharge pressure of the pumps and a revolution rate of the engine; and correcting the object speed such that it is reduced when the dischargeable amount of fluid flow of the pumps is not sufficient to move the cylinders with the object speed; and generating predetermined electrical signals corresponding to the calculated data for the expected position which each cylinder is to reach.

Further, the controlling method according to the present invention utilizes the position control based on the stored position data of each attachment when the repeated work is performed. Thereby, each attachment is maintained in its desired position regardless of the hardness of the ground.

Further, because the operation mode can be stored at the time of storing the data for predetermined work, it is possible to compare the data when the repeated work is performed, and the performance speed of the repeated work can be controlled as much as intended by the operator.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

Figure 2:
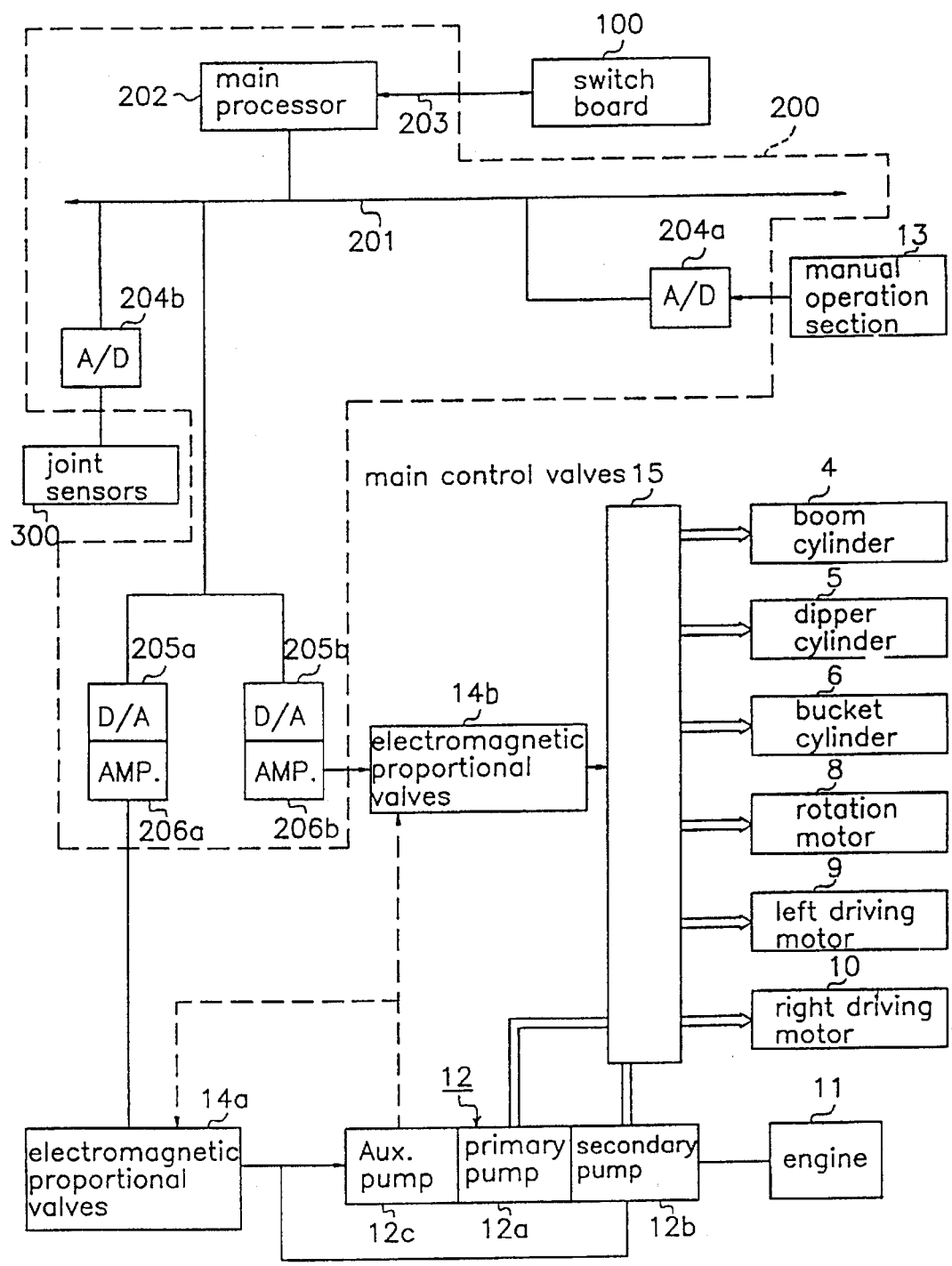
FIG. 2 is a schematic block diagram illustrating the control system for embodying the present invention which is incorporated in the major components of the excavator vehicle.

Referring to FIG. 2, there is shown a control system for embodying the present invention which is incorporated within the major components of the excavator vehicle. The disclosed major parts of the excavator vehicle are an actuator group such as a boom cylinder 4, a dipper cylinder 5, a bucket cylinder 6, a rotation motor 8, a left driving motor 9, and a right driving motor 10. In addition, reference numerals 11 and 12 denote an engine and an associated pumps, respectively. Reference numeral 15 denotes main control valves for controlling the fluid pressures supplied to the above actuator group, and reference numerals 14a and 14b denote electromagnetic proportional valves controlled by electrical signals provided by the control system as referred to later.

Further, the pumps 12 consist of two main pumps 12a and 12b for generating the fluid pressures and a secondary pump 12c for generating the pilot pressure. The main control valves 15 consist of a plurality of control valves, the number of which corresponds to the number of components of the actuator group. Similarly, the number of electromagnetic proportional valves 14a and 14b corresponds to the number of pumps and the main control valves 15.

Since the above described components relative to the excavator vehicle are well known in the art, the detailed explanation for the construction of the excavator vehicle will be omitted.

Turning to the present invention, the control system is comprised of a switch board 100 which includes data input and storage and a display for communicating with the operator; a control board 200 for carrying out the control operation; and joint sensors 300 for detecting the position of each of the joints of the excavator vehicle.

Referring again to FIG. 2, the control board 200 includes a main processor 202 connected with the switch board 100 via a local bus 203 and with the internal system bus, analog to digital (A/D) converters 204a and 204b for transforming the electrical signals provided by manual operation section 13 (includes the manual operating means such as control levers or pedals) and the attachment sensors 300 into the respective digital data which is to be processor in the main processor 202, digital to analog (D/A) converters 205a and 205b for converting the instructive digital data provided by the main processor 202 via the system bus 201 into the analog voltage level signals, and amplifiers 206a and 206b for providing the driving signals to the electromagnetic proportional valves 14a and 14b, respectively.

When the operator inputs instructions for the automatic operation of repeated work via a key pad in the switch board 100, these instructions are transferred to the main processor 202 via the local bus 203. Then the main processor 202 reads in the position data of each attachment of the excavator vehicle from the pivot sensors 300 by way of the A/D converter 204b, and stores them together with the operational mode in the data storage means in the switch board 100.

Also, the operational mode is determined by the operator selecting a related key in the key pad according to the degree of the work load.

At this time, when the operator operates the manual operating section 13 in order to control the moving speed of the actuator group, i.e., each of the cylinders 4,5,6 and motors 8,9,10, the electrical signal corresponding to the amount of operation is converted into digital data by the A/D converter 204a and transferred to the main processor 202.

Thus, the main processor 202 receives the digital data related to the speed of the manual operations and calculates speed directive values related to each attachment. The main process 202 then provides output digital signals representative of the speed directive values.

The output digital signals from the main processor 202 are converted to the analog voltage level signals by the D/A converters 205a and 205b. The analog voltage level signals are then provided to each of the amplifiers 206a and 206b in order to amplify the analog level signals and transform them into current signals corresponding thereto.

The output current signals from each of the amplifiers 206a and 206b are provided to the electromagnetic proportional valves 14a and 14b respectively for controlling the pumps 12 and the main control valves 15. Consequently, the first electromagnetic proportional valves 14a generate pilot pressures responsive to the incoming current signals and they are supplied to swash plates (not shown) provided in each of the pumps 12a to 12c, in order to permit the bias degree of each swash plate to be properly regulated, and thereby to allow each pump to have the discharge rate corresponding to the respective bias degree of each associated swash plate.

Similarly, the second electromagnetic proportional valves 14b generate the pilot pressures responsive to the incoming current signals. The pilot pressures are supplied to each of the control valves (not shown) provided in the main control valves 15, in order to permit the spool stroke of each of the main control valves to be properly regulated, and thereby to allow each of the valves to have the flow rate suited for driving the actuator group.

Preferably, the switch board 100 continuously displays the time during which the data related to the work can be stored, considering the capacity of the storage in the switch board 100, when the data representative of the position of each attachment is stored in the storage at predetermined attachment intervals.

Again, if the storing of the work has been completed, the operator instructs that the storing operation has been terminated by way of the key pad.

As described above, after completion of storing of the data in accordance with the performance of the work of the excavator vehicle, the repeat of the work can be carried out such that the operator makes each attachment move with the bucket placed at the position at which the repeated work is to be started, and then gives an instruction for the starting of the repeated work via the key pad of the switch board 100.

Thus, when the instruction for the starting of the repeated work is provided from the switch board 100, the control board 200 reads out the data stored in the storage of the switch board 100 and performs the predetermined control operation accordingly.

Meanwhile, it is preferred that additional control be made prior to giving the instruction such that via the display in the switch board 100 the current position of each attachment and the starting position for the repeated work are shown to the operator, in order to determine the exact starting position.

If errors in measurement between the current position of the attachment and the starting position of the work come to within plus or minus 3 degrees, the control system requests via the switch board 100 the operator to input the starting instruction for the repeated work.

When the instruction is given, the operation for the repeated work is automatically performed according to the control of the control board 200. At this time, each attachment is controlled to move to the starting position, and the final current position of the attachment is set so that it approximately agrees with the prescribed starting position. The main processor 202 of the control board reads out the data related to the position of the attachments and the operational mode from the storage, and calculates the speed required for moving the attachments to the starting point.

From now on, the description will be made with reference of how to control the operation of the repeated work automatically after the attachments have moved to the starting point.

Figure 3:
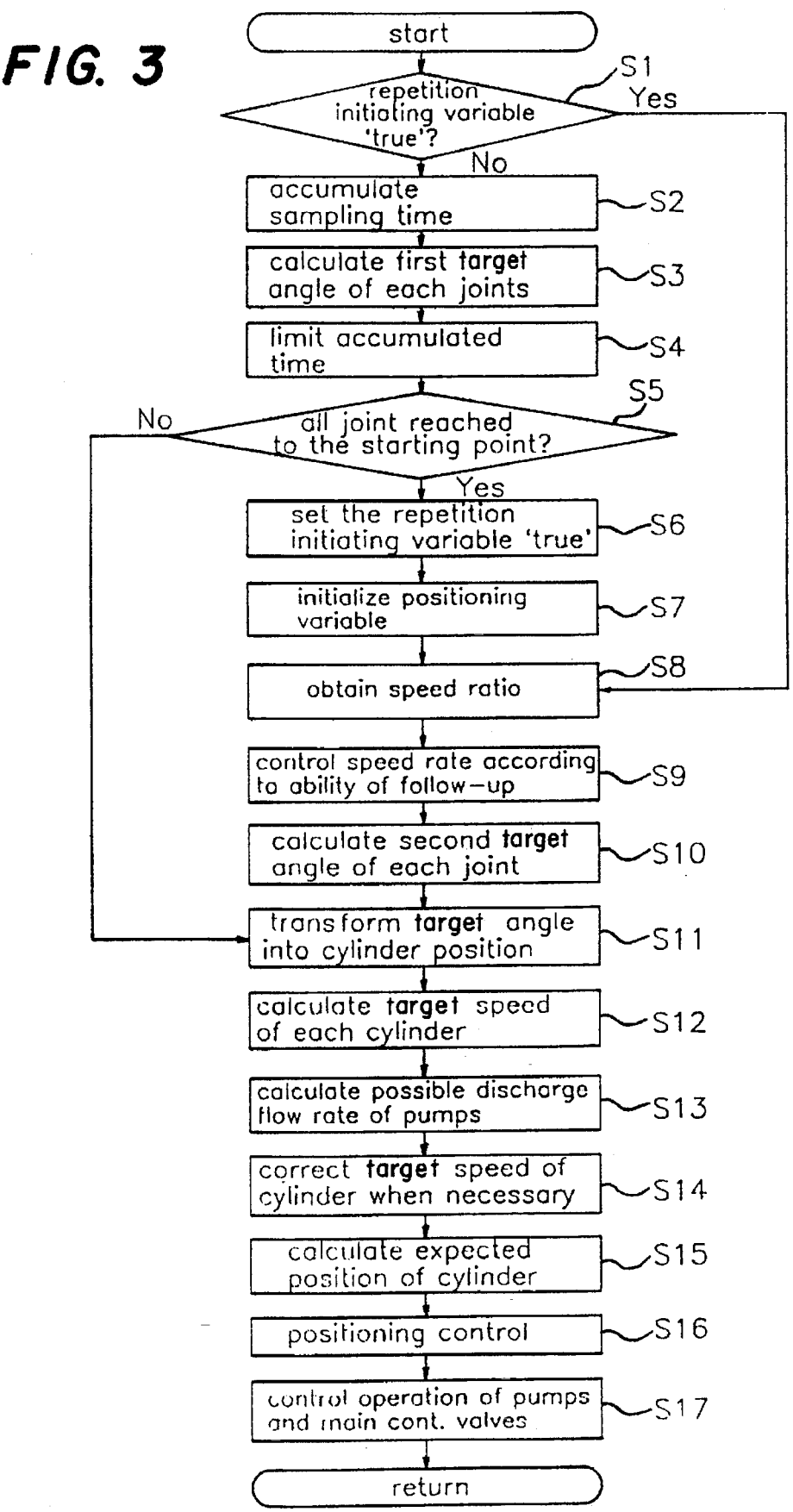
FIG. 3 is a flow diagram illustrating the method according to the present invention.

As a whole, the control operation of the control board 200 is divided into two parts. The first part includes a plurality of steps for moving the attachments from the current position to the starting point, as the steps denoted by S1 to S7 shown in FIG. 3. The second part includes a plurality of steps for controlling the operation with the stored position which are the subsequent steps S8 to S17.

First, when the instruction for initiating the automatic repeated work is received by the control board 200 via the key pad of the switch board 100, the main processor 202 reads out the data value of the repetition initiating variable (go-pb) stored in the storage of the switch board 100, and determines if the value is "true" at step S1 which occurs when the starting and actual position agree.

When the repetition initiating variable (go-pb) represents a value that allows the operation for the repeated work to follow the stored data related to the positioning of the attachments, which is originally set to "false", it will be set to "true" when the current position accords with the starting point.

If the repetition initiating variable (go-pb) is set to "false", the time variable (t) originally set to zero is augmented at every predetermined time period, i.e., every sampling duration in which the positioning signals of each attachment provided by the joint sensors 300 are sampled at step S2.

Next, the target position angle (ta) of each attachment is calculated at step S3.

When the target angle (ta) is a function related to the angle (sa) of each attachment at the moment of starting of the repeated work and the angle fa() of each attachments at the moment starts the storing operation for the repeated work, the time (t) is accumulated for the predetermined time period, and the expected time (ft) required for each attachment to move from the current position to the starting point is determined. The equation for the object angle ta() of each attachment is:

$$ta(i)=sa(i)+3(fa(i)-sa(i))(t/ft)^2-2(fa(i)-sa(i))(t/ft)^3 \quad (1)$$

where i is an integer for discriminating each attachment.

At the step S4, if the time (t) accumulated for each predetermined time period (e.g., 20 msec) exceeds the preset expected time (ft), the accumulated time (t) is fixed to the preset time (ft).

At the next step S5, a determination is made whether all attachments have reached the starting point.

If it is found that all attachments have reached the starting point, the above-mentioned repetition initiating variable (go-pb) is set to "true" at step S6.

And next, the positioning variable (ang-posi()()) representative of position of each attachment is initialized, and the position data of each attachment is read out from the storage in the switch board at step S7.

The positioning variable (ang-posi()()) may be set, for example, for the previous position data of each attachment to ang-posi(i)(0), for the current read-in position data to ang-posi(i)(1).

After reading out the positional data of each attachment, it compares the operational mode at the time of storing the data with the one for the repeated work, and obtains the speed rate (tp-ratio) between the speed of work at the time of the storing the data and the speed to be performed at the repeated work at step S8.

The speed rate (tp-ratio) may vary dependent upon the features of the excavator vehicle. For example, if the operational mode at the time of storing of the data is made under light excavating mode, in which the amount of fluid flow i.e. flow rate to be discharged by the pumps 12a and 12b under the constant pressure (e.g., 100 bar) would be 100, i.e. maximum flow rate whereas the operational mode of the repeated work will be made under a heavy excavating mode in which the amount of flowing would be 200, i.e. maximum flow rate. In this case, the speed rate (tp-ratio) becomes 2 (200/100), which means the repeated work can be accomplished two times faster than the work performed at the time of storing of the data.

If the fluid flow supply of the pumps is not sufficient for achieving the required target position due to the fluctuation of the load pressure, the above speed rate (tp-ratio) is reduced to its minimum rate, and eventually if it is difficult to achieve the position, the speed rate (tp-ratio) is set to zero (0) to not change the required target position at step S9.

The subsequent step S10 is a determination procedure for positioning each attachment to the target position. The detailed explanation of this step is as follows:

First the data is processed corresponding to the speed rate (tp-ratio) obtained at step 9 for preventing abrupt changes of the data by having the data pass through a digital filter. The data representing the speed rate through the digital filter is accumulated as a variable which is initially set to zero and has the following expression:

$$num=Digital-Filter\ (tp\text{-}ratio) \quad (2)$$

Further, the positive integer variable (N-prev) initially set to zero has the data value of the positive integer variable N which has the following expression:

$$\text{N-prev}=\text{N} \quad (3)$$

The decimal portion of the value of the variable num is replaced by a predetermined variable m, and the integer portion thereof is replaced by the variable N. If the value of the variable N is larger than that of the variable N-Prev, the stored data relating to the position of the attachments and the operational mode are read from the storage in the switch board 100 in order to replace the data of variable ang-posi(i)(0) with that of variable ang-posi(i)(1) and to store the newly read data as the variable ang-posi(i)(1).

That is, the variable ang-posi(i)(0) has the positional data of each attachment, which is read previously. At the variable ang-posi(i)(1) the currently read positional data from the storage means is allocated. As mentioned before, i represents an integer representative of each attachment.

At this time, a second target position angle ta() of each attachment is calculated. The target angle ta() is a function of the variable ang-posi(i)(0), the variable ang-posi(i)(1), and the variable m. The equation for the second target angle ta() of each attachment is:

$$ta(i)=(1-m)\times ang\text{-}posi(i)(0)+m\times ang\text{-}posi(i)(1) \quad (4)$$

where i is an integer for identifying each attachment.

Equation (4) means that the work speed of the repeated work can be differentiated from that of at the storing of the desired work by controlling the time and position of the attachments according to the speed rate (tp-ratio), without depending upon the position data read out of the storage per the predetermined time interval.

After completing the above described positioning process of each attachment, the next step S11 is performed to transform the target angle of the attachments of boom, the dipper and the bucket into the desired position of each cylinder.

Figure 1:
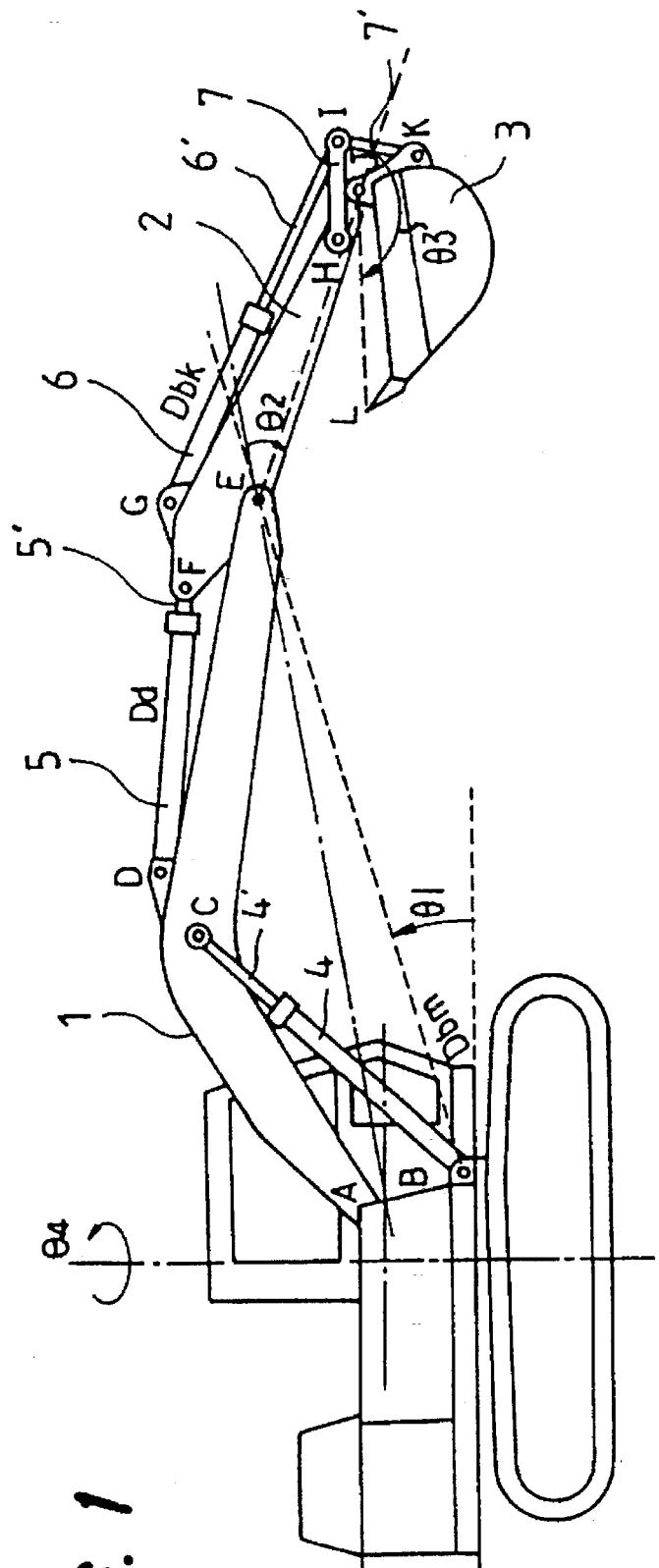
FIG. 1 is a side elevation of the conventional excavator vehicle.

The transforming process related to each attachment is represented by the following equations:

A. For the relationship between the joint angle ($\Theta_1$) of the boom 1 of FIG. 1 and the length (Dbm) of the boom cylinder 4:

$$Dbm=(LEN\text{-}AB)^2+(LEN\text{-}AC)^2-2\times LEN\text{-}AB\times LEN\text{-}AC\times \cos(ANG\text{-}CAE+ANG\text{-}BAX3+\Theta_1)^{1/2} \quad (5)$$

B. For the relationship between the pivot angle ($\Theta_2$) of the dipper 2 of FIG. 1 and the length (Dd) of the dipper cylinder 5:

$$Dd=(LEN\text{-}DE)^2+(LEN\text{-}EF)^2-2\times LEN\text{-}ED\times LEN\text{-}EF\times \cos(ANG\text{-}ALPHA7-\Theta_1)^{1/2} \quad (6)$$

C. For the relationship between the pivot angle ($\Theta_3$) of the bucket 3 of FIG. 1 and the length (Dbk) of the bucket cylinder 6:

$$\alpha = \pi - (\Theta_3 + ANG\text{-}LJK + ANG\text{-}HJK); \quad (7)$$
$$\text{if } \Theta_3 \geq BK\text{-}ALGO\text{-}CHG\text{-}ANG$$
$$= \pi + ANG\text{-}LJK + ANG\text{-}HJK + \Theta_3; \quad (8)$$
$$\text{if } \Theta_3 < BK\text{-}ALGO\text{-}CHG\text{-}ANG$$

$$\phi = ANG\text{-}GHJ - \psi - \beta; \text{ if } \Theta_3 \geq BK\text{-}ALGO\text{-}CHG\text{-}ANG \quad (12)$$
$$= ANG\text{-}GHJ - \psi + \beta; \text{ if } \Theta_3 < BK\text{-}ALGO\text{-}CHG\text{-}ANG \quad (13)$$

$$Dbk=(LEN\text{-}GH)^2+(LEN\text{-}HI)^2-2\times LEN\text{-}GH\times LEN\text{-}HI\times \cos(\phi)^{1/2} \quad (14)$$

in the above equations (7) to (14), for example, LEN-AB represents the linear length between a pivot point A and a pivot point B. Similarly, ANG-ABC represents the angle between a line AB and a line BC, and BK-ALGO-CHG-ANG represents the pivot angle of the bucket 3, that will change the expression, and ANG-ALPHA7 represents $\pi$–ANG-JEF–ANG-CED–ANG-BEC.

After completion of the above described transforming process, the process for obtaining the required target speed of each cylinder for driving each attachment is performed in step S12.

Subsequently, a possible discharge amount of fluid flow of the pumps is calculated in step S13 taking into consideration the calculated target speed for each cylinder, the discharge pressure of the pumps sensed by means of a pressure sensor, and the revolution rate of the engine sensed by a speed sensor.

If the calculated dischargeable fluid flow amount does not satisfy the required target speed of each of the cylinders, the object speed of each cylinder is reduced respectively by a constant rate. That is, the target speed of each cylinders is corrected when necessary at step S14.

Next in step S15, the expected position to which each of the cylinders is to be moved to is calculated.

Finally, electrical signals corresponding to the calculated data for the expected position which each cylinder is to reach are supplied to the electromagnetic proportional valves 14a and 14b to cause each of the cylinders to move to the desired position considering the required object position of each cylinder as well as the position error which occurred at the previous sampling procedure at step S16 and S17.

As apparent from the foregoing, the controlling method according to the present invention utilizes the position control based on the stored position data of each attachment when repeated work is to be performed. Thereby, each attachment is able to maintain its desired position regardless of the hardness of the ground.

Further, because the operational mode can be stored at the same time of storing of the data for predetermined work, it is able to be compared with the operational mode when repeated work is being performed. The performance speed of the repeated work can be controlled as much as intended by the operator. That is, the repeated work can be performed with a rapid speed when a non-skilled operator stores the operation of predetermined work with a slow speed. Therefore, the work efficiency of the excavator vehicle is enhanced.

What is claimed is:

1. A method for automatically controlling repetitive operations of a construction machine having a plurality of attachments, said method comprising:

storing during a teaching mode in a memory device a plurality of operational positions defined by manual actions of the attachments including attachment pivot angles of a boom, dipper stick and bucket and an angle of rotation of the construction machine of a work mode used in the construction machine to regulate fluid flow from a hydraulic pump according to a work load or a ground condition; and providing during a repetitive mode a repetitive operation control signal responsive to the stored angles and controlling a work mode of the attachments in accordance with the control signal to automatically perform a controlled operation of the manual actions of an operator during the repetitive mode and controlling a speed of the work mode performed by the construction machine during the repetitive mode by comparing a maximum flow rate of the hydraulic pump of the work mode in the teaching mode with a maximum flow rate of the hydraulic pump of the work mode in the repetitive mode to regulate the fluid flow from the hydraulic pump to cylinders to power the attachments according to the work load or the ground condition in the repetitive mode.

2. A method in accordance with claim 1 further comprising:

moving all of the plurality of attachments automatically to a starting position for the repetitive mode that is identical to a starting position in the teaching mode.

3. A method in accordance with claim 1, further comprising:

calculating a target angle position of each of the plurality of attachments according to the work mode for a variable speed of operation in the repetitive mode.

4. A method in accordance with claim 1, further comprising:

decreasing a target speed of each of the plurality of attachments repetitively by an identical rate to maintain a direction of repetitive operation if a calculated dischargeable fluid flow amount does not satisfy the target speed of each of the plurality of attachments.

5. A method in accordance with claim 3, further comprising:

transforming the target angle position of each of the plurality of attachments into positions of the cylinders providing fluid flow to move the attachments.

* * * * *